United States Patent [19]
Miwa et al.

[11] Patent Number: 5,582,677
[45] Date of Patent: Dec. 10, 1996

[54] OPTICAL DISK PRODUCING APPARATUS

[75] Inventors: Hiroaki Miwa, Yokohama; Ryoichi Sudo, Yokosuka; Tetsuo Tajima, Fujisawa; Toshiaki Taii, Toride, all of Japan

[73] Assignee: Hitachi, Ltd., Tokyo, Japan

[21] Appl. No.: 136,767

[22] Filed: Oct. 15, 1993

[30]   Foreign Application Priority Data

Oct. 16, 1992  [JP]  Japan .................................... 4-278339

[51] Int. Cl.$^6$ .................................................. B32B 31/00
[52] U.S. Cl. .......................... 156/382; 156/381; 156/580; 425/405.1
[58] Field of Search ................................... 156/382, 381, 156/580; 369/280, 286; 264/101, 102, 107, 571; 425/407, 450.1, DIG. 60, 405.1, 394, 395

[56]            References Cited

U.S. PATENT DOCUMENTS

| | | | |
|---|---|---|---|
| 4,867,924 | 9/1989 | Schilkey et al. | 264/101 |
| 4,908,087 | 3/1990 | Murooka et al. | 156/382 |
| 4,990,208 | 2/1991 | Kano | 156/286 |
| 5,146,438 | 9/1992 | Harper | 369/286 |
| 5,256,235 | 10/1993 | Howell et al. | 156/382 |

FOREIGN PATENT DOCUMENTS

| | | |
|---|---|---|
| 61-50231 | 3/1986 | Japan . |
| 63-67258 | 12/1988 | Japan . |
| 3-70296 | 11/1991 | Japan . |

*Primary Examiner*—Michael W. Ball
*Assistant Examiner*—Richard Crispino
*Attorney, Agent, or Firm*—Fay, Sharpe, Beall, Fagan, Minnich & McKee

[57]            ABSTRACT

An optical disk producing apparatus produces an optical disk by bonding a pair of replica disks together. The replica disks are disposed in a sealed space to oppose to each other with a predetermined gap therebetween. The sealed space is defined by a peripheral wall and opposite ends. The peripheral wall is divided into two portions which are slidingly movable relative to each other. When the sealed space is evacuated, the two portions are moved to apply an atmospheric pressure to the replica disks, so that the replica disks are bonded together into an optical disk.

3 Claims, 6 Drawing Sheets

OPTICAL DISK PRODUCING APPARATUS

BACKGROUND OF THE INVENTION

The present invention relates to an apparatus for producing an optical disk which is suitable for use as a medium for storage, recording and reproduction of information such as voice information and image information.

In general, an optical disk has a transparent replica substrate made of a transparent material such as a sheet of glass or plastics having a information pattern presented by consecutive protrusions and recesses in the form of grooves or pits formed therein. A recording metal layer and a protection layer are successively formed on the replica substrate and two such replica substrates are bonded together through an adhesive agent layer.

Hitherto, optical disks of the kind described have been produced by using a press machine which bonds two replica substrates together through a thermoplastic hot-melt adhesive agent in the atmosphere, as disclosed in Japanese Patent Examined Publication No. 63-67258, in order to simplify the production process and to reduce the cost of production. Alternatively, an apparatus which employs a combination of a vacuum chamber and a press machine has been used for bonding the replica substrates, as disclosed in Japanese Patent Unexamined Publication No. 61-50231 and Japanese Patent Examined Publication No. 3-70296.

In recent years, there is an increasing demand for higher speed of processing of information, which in turn requires high-speed driving of optical disks. This has given rise to a demand for optical disks which are not easily deformed even when driven at high speeds. The conventional production method, which relies upon bonding in the atmosphere by a press machine, tends to allow generation of voids and cavities between the adhesive layers, with the result that the closeness of bonding between two replica substrates is impaired. In addition, optical disks produced by such a conventional process tends to suffer from corrosion of the recording layer, deterioration in the adhesive agent and other problems due to deformation and invasion of moisture into the voids and cavities, which occur during shelving or driving of the disks. The alternative method which employs the combination of a vacuum chamber and a press machine also is disadvantageous in that it requires a large-size vacuum chamber for the purpose of accommodating the press machine. It is difficult to evacuate such a large vacuum chamber in a short time. In addition, the press machine also has to be large in size, in order to deform the vacuum chamber. Consequently, the whole production apparatus is required to have an impractically large size.

Thus, the known production methods require improvements in terms of the quality of the product disks and the time required for the production, and so forth.

SUMMARY OF THE INVENTION

Accordingly, an object of the present invention is to provide a production apparatus which is small in size but yet capable of high-speed production of optical disks which are substantially free of defects such as deformation or delamination, thereby overcoming the above-described problems of the known art.

To this end, according to the present invention, is provided including an optical disk producing apparatus: a sealed space in which a pair of replica disks, each having a substrate on which an information pattern, a recording film, a protective film and an adhesive layer are successively laminated. The pair of disks disposed to oppose to each other with a predetermined gap therebetween. The apparatus also includes; for evacuating an interior of said sealed; and means for transmitting an atmospheric pressure to said replicas in said sealed space.

DETAILED DESCRIPTION OF THE PREFERRED EMBODIMENTS

Figure 1:
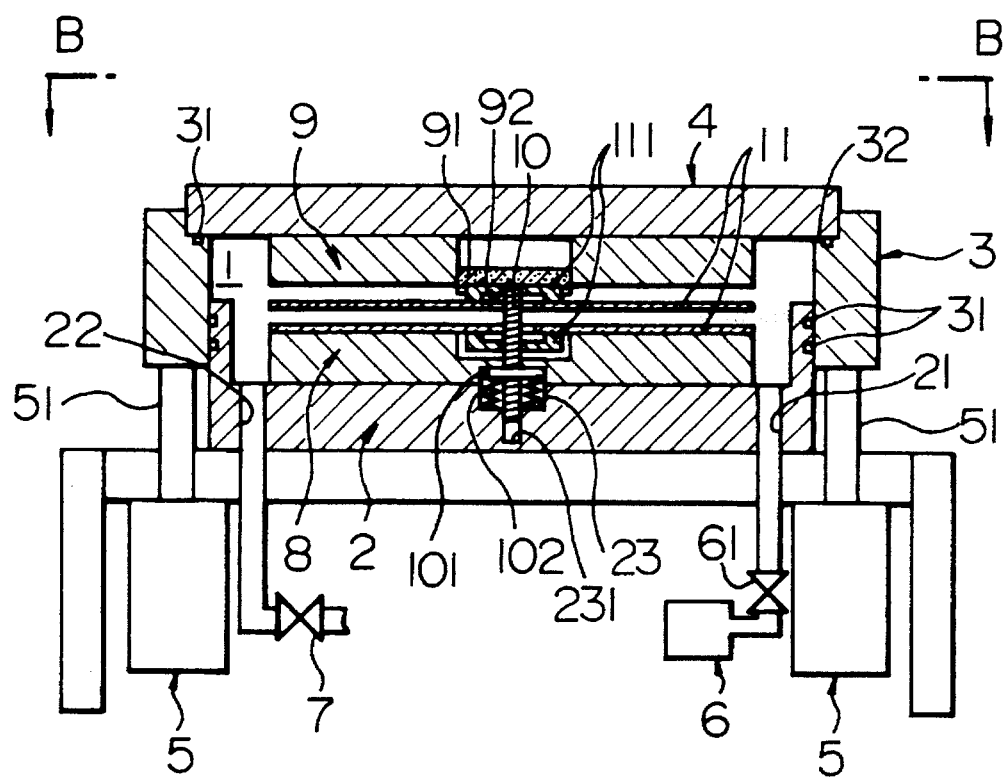
FIG. 1 is a sectional view of an optical disk producing apparatus in accordance with a first embodiment of the present invention.
Figure 1A:
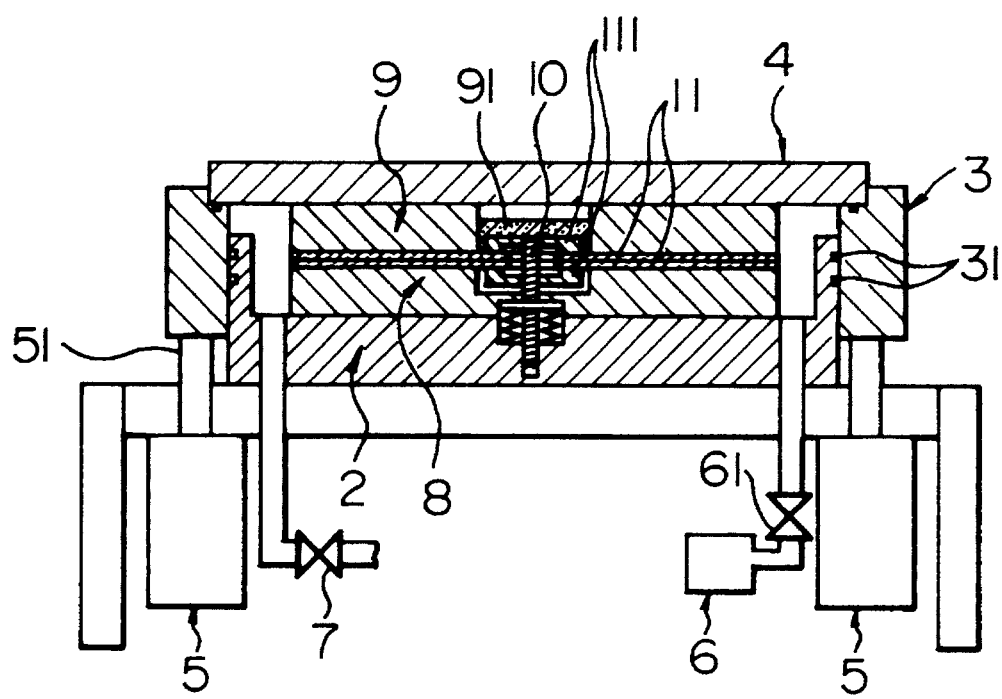
FIG. 1A is a sectional view of the apparatus shown in FIG. 1 in operation.
Figure 1B:
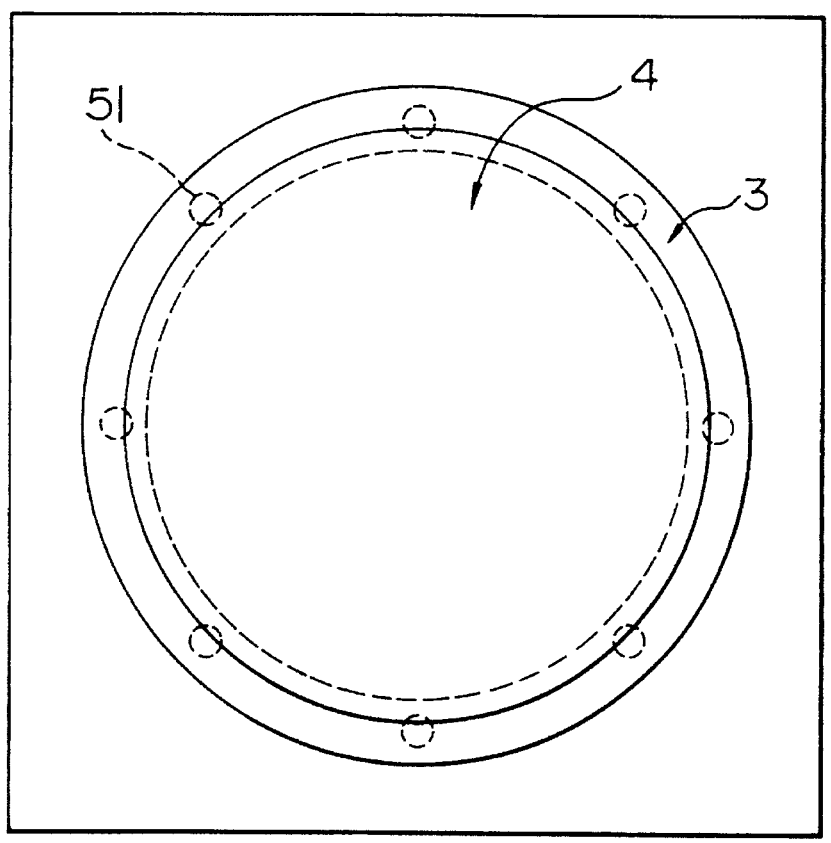
FIG. 1B is a top view taken from the line B—B of FIG. 1.

Referring to FIGS. 1 to 1B, an optical disk producing apparatus embodying the present invention has a hermetically sealed space 1 which forms a vacuum zone. The space 1 is defined by a bottomed tubular member 2 (or first tubular member) placed on a frame, a cylindrical member 3 (or second tubular member) and a circular lid 4 (or cover member). The cylindrical member 3 fits on the outer periphery of the tubular member 2 with O-rings 31 placed therebetween, for sliding movement relative to the tubular member 2. The lid 4 is mounted on the shoulder 32 of the cylindrical member 3 through an O-ring 31. A plurality of pneumatic cylinders 5 are equiangularly mounted on the frame. A piston 51 of each of the pneumatic cylinders 5 (or air cylinders contacts at an end thereof with a lower end surface of the cylindrical member 3.

The space 1 communicates with a vacuum pump 6 through a communication hole 21 formed in the bottom of the tubular member 2. The vacuum pump 6 has a valve 61. The space 1 also communicates with the atmosphere through a leak valve 7 via a communication hole 22 in the bottom of the tubular member 2. The tubular member 2 is provided at a centre portion thereof with a circular recess 23. A centre pin 10 is slidably received in a bore 231 formed in the circular recess 23.

A ring-shaped lower pressing die 8 is fixed to the tubular member 2. A spring seat 101 and a spring 102 are received in the recess 23 of the tubular member 2 and a central opening of the lower pressing die 8. The center pin 10 projects beyond the lower pressing die 8.

A ring-shaped upper pressing die 9 is fixed to the lid 4. A magnet member 91 is detachably secured in a circular central opening in the upper pressing die 9. A recess 92 formed in a centre portion of the magnet member 91 is adapted to receive a hub 111 which is attached integrally to a replica 11.

The apparatus having the above-described construction operates in the following manner.

Pneumatic cylinders 5 are actuated with the valve 61 closed while the leak valve 7 is opened, so that the pistons 51 are extended to push the cylindrical member 3 upward, and then the cylindrical member 3 is held at this elevated position.

After the centre pin 10 is inserted into the opening in the hub 111 for the purpose of centering. Then, a one replica 11 with the hub 111 attached thereto is placed on the lower pressing die 8. Then, after attaching the magnet member 9 to the hub 11 associated with the other replica 11 through magnetic attraction, the opening of the hub 111 of the other replica 11 is brought into alignment with the centre pin 10. Consequently, the two replicas 11 face each other across a gap of about 10 mm in alignment with each other. Then, the lid 4 to which the upper pressing die 9 is fixed is seated on the shoulder 32 of the cylindrical member 3. Subsequently, the leak valve 7 is closed and the valve 61 is opened. Then, the vacuum pump 6 is actuated to reduce the pressure of the interior of the sealed space 1 down to about 665 Pa.

After the valve 61 is closed, the pneumatic cylinders 5 are opened to the atmosphere so as to release the cylindrical member 3 which has been supported by the pistons 51. Consequently, the cylindrical member 3 is pressed down by the force of the atmospheric pressure acting on the lid 4. The force of the atmospheric pressure then acts on the replicas 11 through the upper pressing die 9, whereby two replicas 11 are bonded together, as shown in FIG. 1A.

The leak valve 7 is opened at a moment which is about 2 seconds after the bonding. At the same time, the pneumatic cylinders 5 are activated to lift the cylindrical member 3 and the lid 4. Consequently, the replicas 11, 11 and the centre pin 10, together with the magnet member 91 attaching thereto, are elevated by the force of the springs 102. The lid 4 is detached from the cylindrical member 3 and then the replicas 11, 11 bonded together into an optical disk are removed from the centre pin 10.

It is thus possible to obtain an optical disk which is free of voids and cavities between two replicas. It will be seen that the bonding of two replicas can be accomplished without using any large-size machine, because the bonding force is derived from the atmospheric pressure.

Figure 2:
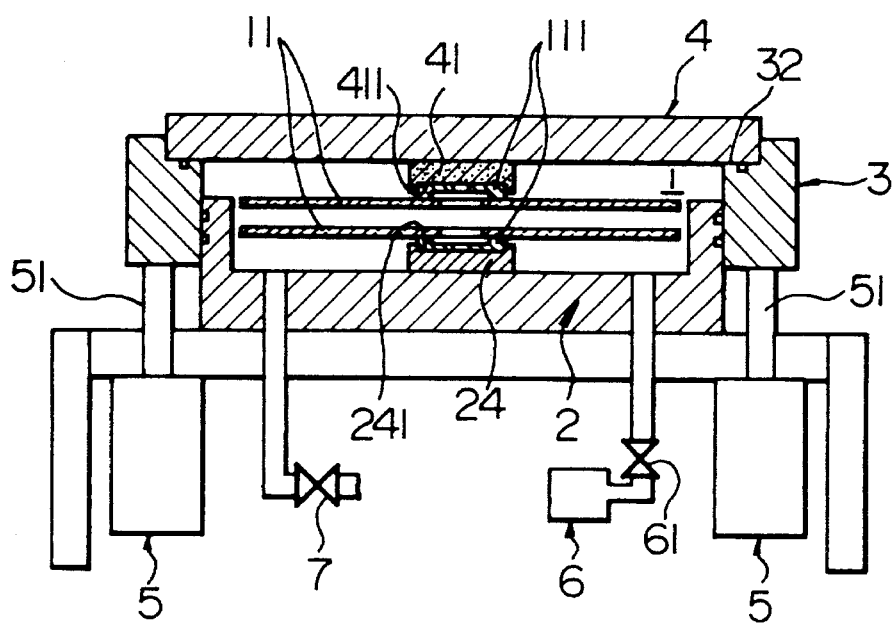
FIGS. 2 to 10 are sectional views of different embodiments of the optical disk producing apparatus of the present invention.

FIG. 2 illustrates another embodiment of the optical disk producing apparatus of the present invention. This embodiment is characterized in that it employs means for locating replicas 11, 11 different from the locating means used in the first embodiment and in that it does not necessitate any pressing die.

In this embodiment, a locating jig 24 having a recess 241 for receiving the hub 111 associated with one replica 11 is fixed to a centre portion of the bottomed tubular member 2. A magnet member 41, which has a recess 411 for receiving the hub 111 of the other replica 11, is fixed to the centre of the lid 4.

The operation of this embodiment of the optical disk producing apparatus is as follows.

The valve 61 is closed, while the leak valve 7 is opened. Pneumatic cylinders 5 are activated to extend the pistons 51, thereby lifting the cylindrical member 3 and holding the latter at this elevated position.

The hub 111 associated with one of the replicas 11 is received in the recess 241, while the hub 111 associated with the other replica 11 is fixed in the recess 411 in the magnet member 41 by magnetic attraction. Then, the lid 4 is seated on the shoulder 32 of the tubular member 3. Consequently, both replicas 11, 11 face with each other across a gap of about 10 mm in alignment with each other. Then, the leak valve 7 is closed and the valve 61 is opened, and the vacuum pump 6 is started to evacuate the interior of the sealed space 1 down to about 665 Pa.

After the valve 61 is closed, the pneumatic cylinders 5 are opened to the atmosphere, thereby releasing the cylindrical member 3 which has been supported by the pistons 51. As a result, the cylindrical member 3 is pressed down by the force of the atmospheric pressure acting on the lid 4. Consequently, the force produced by the atmospheric pressure acts on the replicas 11, 11 through the magnet member 41, thereby bonding these two replicas together.

After about 2 seconds, the leak valve 7 is opened and the pneumatic cylinders 5 are driven to lift the cylindrical member 3 and the lid 4. Then, while the bonded replicas 11, 11 are still attracted on the magnet member 41, the lid 4 is detached from the cylindrical member 3, and then the replicas 11, 11 which are now integral with each other are removed from the magnet member 41.

It will be understood that this embodiment does not necessitate any pressing die, so that the construction of the whole production apparatus is simplified.

Figure 3:
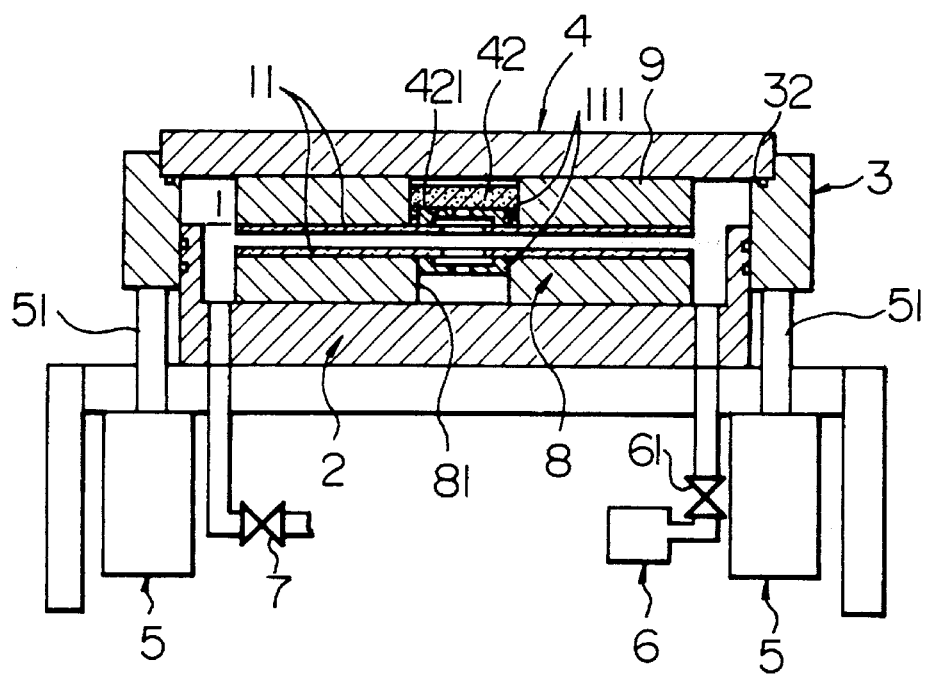

FIG. 3 shows a third embodiment of the optical disk producing apparatus of the present invention. This embodiment features a means for locating the replicas different from the locating means used in the first embodiment. A ring-shaped lower pressing die 8 is fixed to the bottomed tubular member 2. The lower pressing die 8 has a central opening 81 which is so dimensioned as to be engageable with a hub 111 attached to a replica 11. A ring-shaped upper pressing die 9 is secured to the lid 4. The upper pressing die 9 has a circular central opening which receives a magnet member 42. The magnet member 42 has a central recess 421 which is adapted to receive a hub 111 associated with the other replica 11. The lower pressing die 8 and the upper pressing die 9 are so located relative to each other that the opening 81 and the recess 421 are axially aligned with each other.

The third embodiment of the optical disk producing apparatus having the above-described construction operates as follows.

The valve 61 is closed while the leak valve 7 is opened. Then, pneumatic cylinders 5 are driven to extend the pistons 51, thereby lifting the cylindrical member 3 and holding the latter at this elevated position.

The hub 111 associated with one of the replicas 11 is mounted in the central opening 81 of the lower pressing die 8. Meanwhile the hub 111 associated with the other replica 11 is fixed in the recess 421 of the magnet member 42 by magnetic attraction. Then, the lid 4 is seated on the shoulder 32 of the cylindrical member 3.

Consequently, two replicas 11, 11 face each other across a gap of about 10 mm in alignment with each other. Then, the leak valve 7 is closed and the valve 61 is opened, and the vacuum pump 6 is operated to reduce the pressure of the interior of the sealed space 1 down to about 665 Pa. Then, after the valve 61 is closed, the pneumatic cylinders 5 are opened to the atmosphere so as to release the cylindrical member 3 which has been supported by the pistons 51. Consequently, the cylindrical member 3 is pressed down by the force produced by the atmospheric pressure acting on the lid 4. This force is applied to both replicas 11, 11 through the upper pressing die 9, whereby these two replicas 11, 11 are bonded together.

Then, about 2 seconds later, the leak valve 7 is opened and the pneumatic cylinders 5 are activated so as to lift the cylindrical member 3 and the lid 4. Then, while the bonded replicas 11, 11 are still attracted on the magnet member 42, the lid 4 is detached from the cylindrical member 3. Then, the replicas 11, 11 which are now integral are detached from the magnet member 42.

The third embodiment offers an advantage in that the replicas are easily located.

Figure 4:
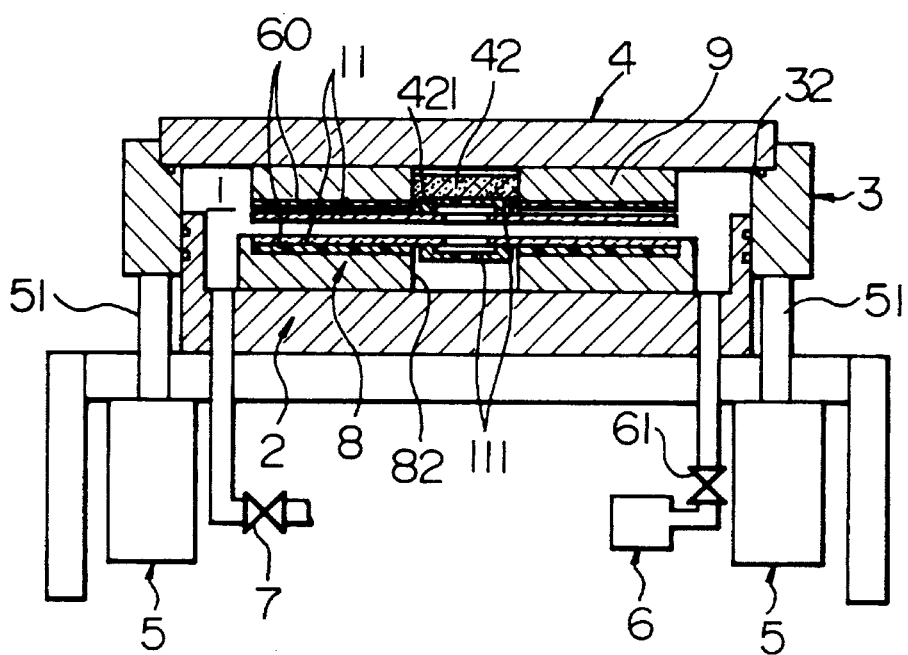

FIG. 4 shows a fourth embodiment of the optical disk producing apparatus of the present invention. The fourth embodiment employs a means for locating the replicas 11, 11 different from the locating means used in the third embodiment.

More specifically, a ring-shaped lower pressing die 8 is secured to the bottomed tubular member 2. The lower pressing die 8 has a central opening 82 which has a size sufficiently greater than that of the hub 111 integrally secured to the replica 11. The lower pressing die 8 has a protruded outer periphery for engagement with the outer periphery of the replica 11. A ring-shaped silicone rubber member 60 is adhered to the lower die 8.

A ring-shaped upper pressing die 9 is fixed to the lid 4. A magnet member 42 is secured in a circular central opening of the upper pressing die 9. The magnet member 42 has a central recess 421 for receiving a hub 111 associated with the other replica 11. A ring-shaped silicone rubber member 60 is also adhered to the upper pressing die 9.

In operation, after the valve 61 is closed and the leak valve 7 is opened, the pneumatic cylinders 5 are activated to extend their pistons 51 so as to raise the cylindrical member 3 and to hold the same at this elevated position.

Then, the hub 111 associated with one of the replicas 11 is mounted on the silicone rubber member 60 adhered to the lower pressing die 8. Meanwhile, the hub 111 associated with the other replica 11 is fixed by magnetic attraction in the recess 421 of the magnet member 9 received in the central opening in the upper pressing die 9. The lid 4 is then seated on the shoulder 32 of the tubular member 3. Consequently, two replicas 11, 11 face each other across a gap of about 10 mm in alignment with each other.

Subsequently, the leak valve 7 is closed and the valve 61 is opened, and the vacuum pump 6 is operated to reduce the pressure of the interior of the sealed space 1 down to about 665 Pa.

After the valve 61 is closed, the pneumatic cylinders 5 are opened to the atmosphere so as to release the cylindrical member 3. Consequently, the cylindrical member 3 is pressed down by the force produced by the atmospheric pressure acting on the lid 4. The force of the atmospheric pressure is applied to both replicas 11, 11 through the upper pressing die 9, thereby bonding these replicas together.

Then, after about 2 seconds, the leak valve 7 is opened and the pneumatic cylinders 5 are activated to lift the cylindrical member 3 and the lid 4. Then, the lid 4 is detached from the cylindrical member 3 while the bonded replicas 11, 11 are still attracted on the magnet member 42. Then, the replicas 11, 11 which are now integral are removed from the magnet member 42.

This embodiment offers an advantage in that the replicas can be located easily and that any impact which may otherwise directly be applied to the replicas are effectively damped by the silicone rubber members.

Figure 5:
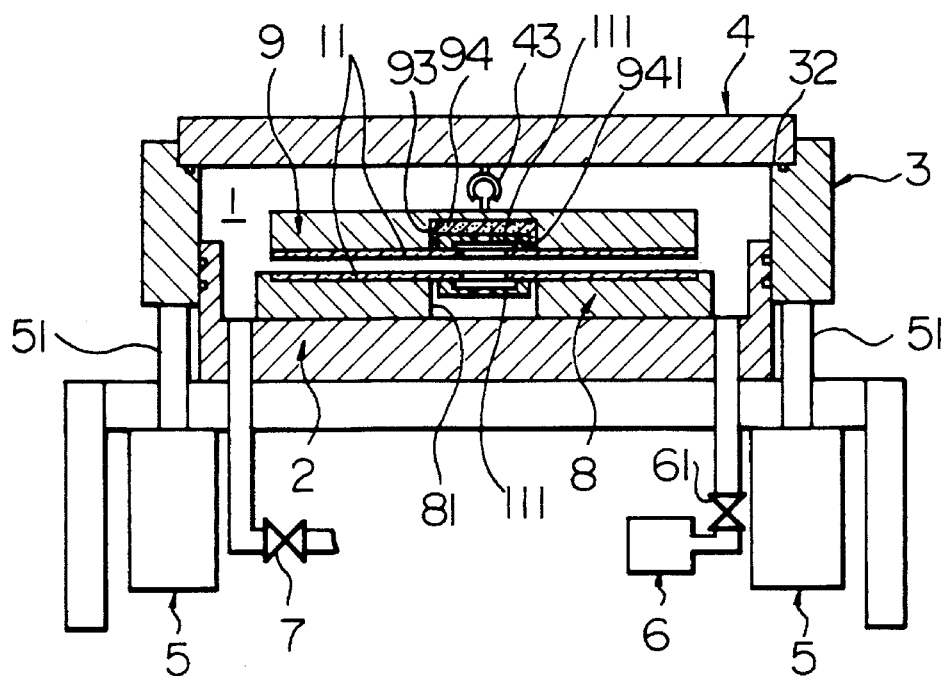

FIG. 5 illustrates a fifth embodiment of the optical disk producing apparatus of the present invention, which employs a means for attaching the upper pressing die 9 to the lid 4 different from the attaching means used in the fourth embodiment.

More specifically, a ring-shaped lower pressing die 8 is fixed to the bottomed tubular member 2. The lower pressing die 8 has a central opening 81 which is sufficiently greater in size than a hub 111 integrally fixed to one of the replicas 11. The lower pressing die 8 has a protruded outer periphery for engagement with the outer periphery of the replica 11.

A ring-shaped upper pressing die 9 is mounted to the lid 4 through a floating joint 43 for omnidirectional pivotal motion. A magnet member 94 is secured in a central circular recess 93 formed in the upper pressing die 9. A recess 941 for receiving a hub 111 associated with the other replica 11 is formed in a centre portion of the magnet member 94.

In operation, after the valve 61 is closed while the leak valve 7 is opened, the pneumatic cylinders 5 are actuated to extend their pistons 51 to lift the cylindrical member 3 and holding the same at this elevated position.

The hub 111 associated with one of the replicas 11 is mounted on the lower pressing die 8, while the hub 111 associated with the other replica 11 is fixed by magnetic attraction in the recess 941 formed in the magnet member 94 attached to the upper pressing die 9. Then, the lid 4 is seated on the shoulder 32 of the cylindrical member 3. Consequently, two replicas 11, 11 face each other across a gap of about 10 mm in alignment with each other.

Then, the leak valve 7 is closed and the valve 61 is opened, and the vacuum pump 6 is operated to evacuate the interior of the sealed chamber down to about 665 Pa.

Then, after the valve 61 is closed, the pneumatic cylinders 5 are opened to the atmosphere so as to release the cylindrical member 3 which has been supported by the pistons 51. Consequently, the cylindrical member 3 is pressed down by the force of the atmospheric pressure which acts on the lid 4. This pressing force acts on the stack of the replicas 11, 11 through the upper pressing die 9, thereby bonding these replicas together.

About 2 seconds later, the leak valve 7 is opened and the pneumatic cylinders 5 are activated to lift the cylindrical member 3 together with the lid 4. The lid 4 is detached from the cylindrical member 3 while the bonded replicas 11, 11 are still attracted on the magnet member 94. Then, the replicas 11, 11 now integral with each other are detached from the magnet member 94.

This embodiment offers an advantage in that the bonding can be achieved with high degree of parallelism between two replicas, by virtue of the use of the floating joint.

Figure 6:
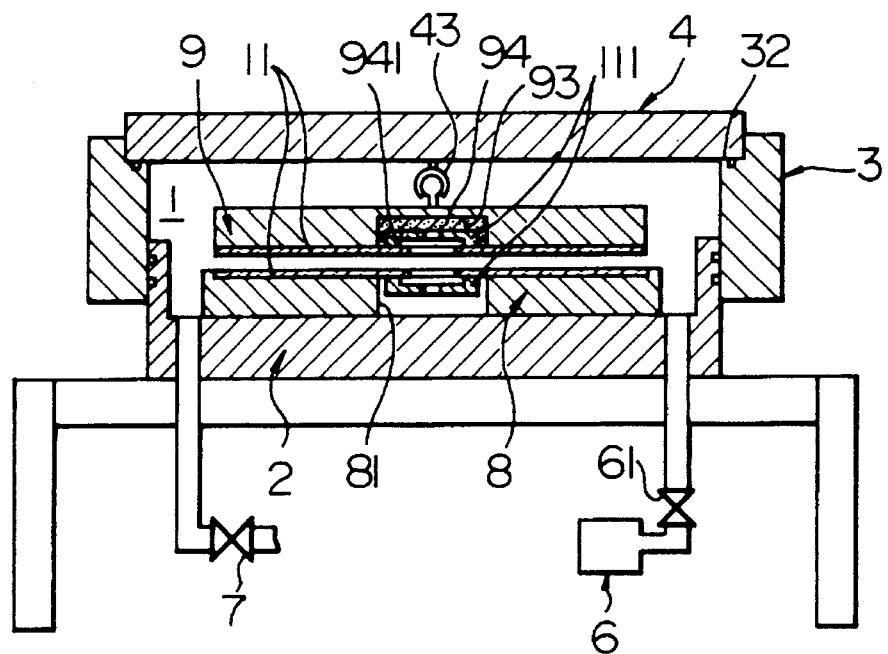

The use of the floating joint also makes it possible to bond the replicas together without using pneumatic cylinders as shown in FIG. 6, because both replicas are held in high degree of parallelism with each other thanks to the floating joint. In such a modification, the size of the whole apparatus can further be reduced.

The operation of this modification is as follows. The valve 61 is closed while the leak valve 7 is opened. Then, the cylindrical member 3 is lifted and held at the lifted position. Then, the hub 111 associated with one of the replicas 11 is mounted on the lower pressing die 8 and the hub 111 associated with the other replica 11 is attracted in the recess 941 of the magnet member 94 held by the upper pressing die 9. Thereafter, the lid 4 is seated on the shoulder 32 of the cylindrical member 3. Then, the leak valve 7 is closed and the valve 61 is opened, and the vacuum pump 6 is operated to evacuate the interior of the sealed space 1 down to about 665 Pa. Consequently, the cylindrical member 3 is pressed down by the force produced by the atmospheric pressure acting on the lid 4. This pressing force acts on the stack of the replicas 11, 11 through the upper pressing die 9, thereby bonding these replicas together.

Figure 7:
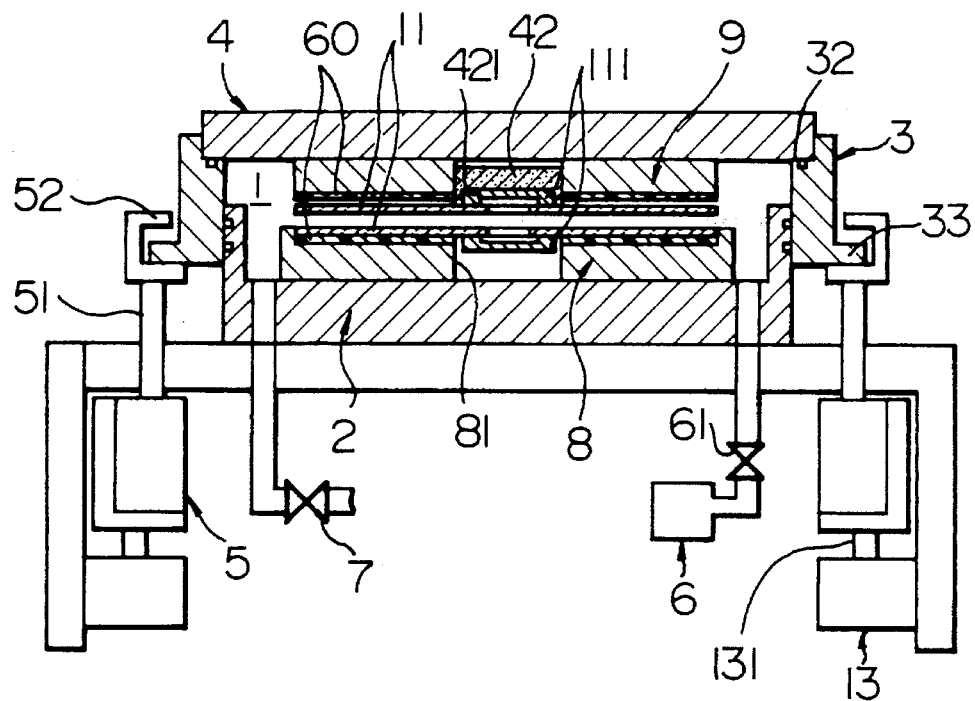

FIG. 7 shows a sixth embodiment of the optical disk producing apparatus of the present invention. This embodiment features an engagement between pneumatic cylinders 5 and the cylindrical member 3 different from the engagement employed in the fourth embodiment, so that the bonding is effected under a pressure which is greater than $1.01\times10^5$ Pa (or 1 atm).

A ring-shaped lower pressing die 8 is fixed to the bottomed cylindrical member 2. The lower pressing die 8 has a central opening 81 which is sized to be sufficiently greater than the hub 111 which is integrally fixed to one of the replicas 11. The lower pressing die 8 has a protruded outer periphery for engagement with the outer periphery of the replica 11. A ring-shaped silicone rubber member 60 is adhered to the lower pressing die 8. A ring-shaped upper pressing die 9 is fixed to the lid 4. A magnet member 42 is fixed in a central circular opening formed in the upper pressing die 9. A recess 421 for receiving the hub 111 associated with the other replica 11 is formed in the centre portion of the magnet member 42. A ring-shaped silicone rubber member 60 is also adhered to the upper pressing die 9.

A radially projecting circumferential flange 33 is formed on the outer periphery of the cylindrical member 3. A hook 52 for loose engagement with the flange 32 is provided on the end of the piston 51 of each pneumatic cylinder 5. Each pneumatic cylinder 5 is secured to the piston 131 of a different pneumatic cylinder 13.

In operation, the valve 61 is closed while the leak valve 7 is opened, and the pneumatic cylinders 5 are activated to push the cylindrical member 3 upward by the hooks 52 on the ends of the pistons 51 and to hold the cylindrical member 3 at this elevated position.

Then, the hub 111 of one of the replicas 11 is placed on the silicone rubber member 60 attached to the lower pressing die 8. At the same time, the hub 111 associated with the other replica 11 is fixed by magnetic attraction in the recess 421 formed in the magnet member 41 held by the upper pressing die 9. Then, the lid 4 is seated on the shoulder 32 of the cylindrical member 3. Consequently, two replicas 11, 11 face each other across a gap of about 10 mm in alignment with each other. The leak valve 7 is closed and the valve 61 is opened, and the vacuum pump 6 is operated to reduce the pressure in the sealed space 1 down to about 665 Pa.

Then, after the valve 61 is closed, the pneumatic cylinder 5 is opened to the atmosphere so as to release the cylindrical member 3 which has been supported by the pistons 51. Consequently, the cylindrical member 3 is pressed down by the force produced by the atmospheric pressure acting on the lid 4. This downward pressing force is applied through the upper pressing die 9 to the stack of the replicas 11, 11 thereby bond these replicas 11, 11 together. Subsequently, the pneumatic cylinders 13 are activated to lower the whole pneumatic cylinders 5, so that the force exerted by the pneumatic cylinders 13 is applied to the replicas 11, 11 through the hooks 52, in addition to the pressing force produced by the atmospheric pressure.

About 2 seconds later, the leak valve 7 is opened and the pneumatic cylinders 13 are opened to the atmosphere. At the same time, the pneumatic cylinders 5 are activated to lift the cylindrical member 3 together with the lid 4. Then, the lid 4 is detached from the cylindrical member 3 while the bonded replicas 11, 11 are still attracted on the magnet member 42. Then, the replicas 11, 11 which are now integral are removed from the magnet member 42.

Figure 8:
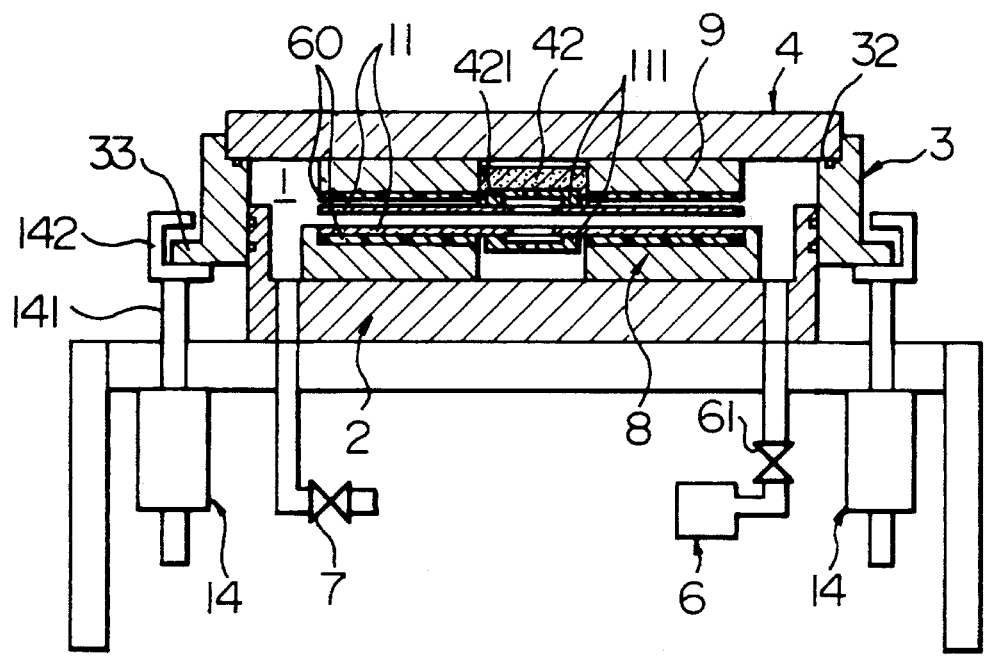

Thus, the sixth embodiment features that the bonding is conducted under application of the force produced by the atmospheric pressure plus the force exerted by the additional pneumatic cylinders. This embodiment, however, may be modified such that, as shown in FIG. 8, a single kind of pneumatic cylinders 14 having long stroke are used in place of the combination of the pneumatic cylinders 5 and 13.

The operation of such a modification is as follows.

After the valve 61 is closed and the leak valve 7 is opened, the pressure supplied to the pneumatic cylinders 14 is so adjusted that the cylindrical member 3 is lifted and held at the lifted position. The hub 111 associated with one of the replicas 11 is mounted on the lower pressing die 8, while the hub 111 associated with the other replica 11 is held by magnetic attraction in the recess 421 formed in the magnet member 42 held by the upper pressing die 9. Then, the lid 4 is seated on the shoulder 32 of the cylindrical member 3. Subsequently, the leak valve 7 and the valve 61 are closed and opened, respectively, and the vacuum pump 6 is operated to reduce the pressure of the interior of the sealed space 1 down to about 665 Pa. After the valve 61 is closed, the pressure in the pneumatic cylinders 14 is lowered so that the flange 33 of the cylindrical member 3 is pressed down by the hooks 142 on the pistons 141. Consequently, the pressing force of the pneumatic cylinders 14 is applied to both replicas 11, 11 through the upper pressing die 9 in addition to the force produced by the atmospheric pressure, thereby bonding these two replicas together. About 2 seconds later, the leak valve 7 is opened and the pneumatic cylinders 14 are activated to lift the cylindrical member 3 and the lid 4. Thereafter, the lid 4 is detached from the cylindrical member 3 while the replicas 11, 11 are still attracted by the magnet member 42. Then, the replicas 11, 11 which are now integrated into an optical disk are detached from the magnet member 42.

Figure 9:
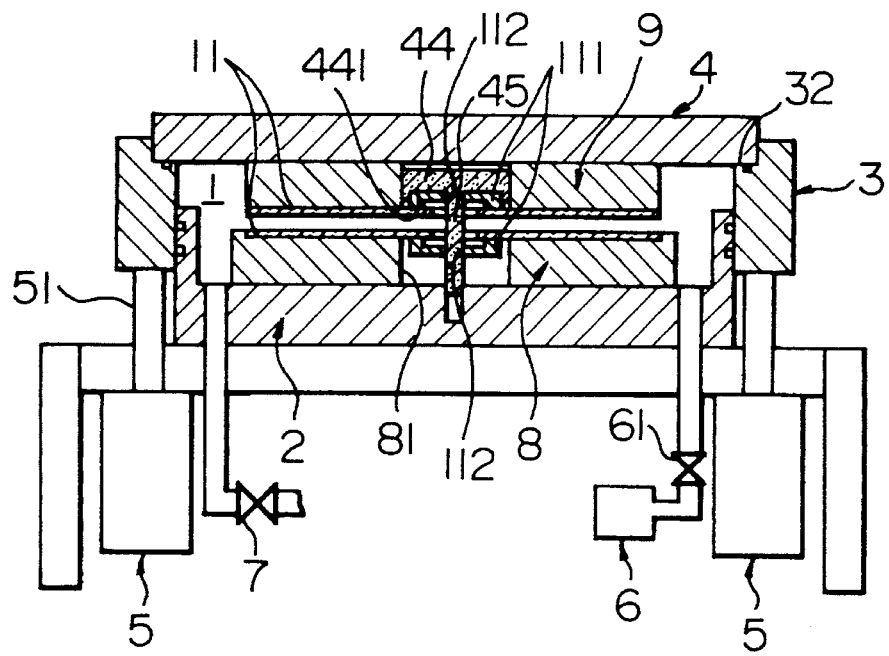

FIG. 9 shows a seventh embodiment of the optical disk production apparatus in accordance with the present invention. This embodiment is similar to the third embodiment described before but employs a different mans for locating the replicas 11, 11.

More specifically, this embodiment has a ring-shaped lower pressing die 8 fixed to the bottomed tubular member 2. The lower pressing die 8 has a central circular opening 81 which is sized to be sufficiently greater than a hub 111 integrally attached to one of the replicas 11.

An upper pressing die 9, which is fixed to the lid 4, has a central circular opening in which a magnet member 44 is fixed. A recess 441 for receiving a hub 111 associated with the other replica 11 is formed in the centre portion of the magnet member 44. A centre pin 45 is integrally provided in the magnet member 44 so as to projects from a centre portion thereof.

In operation, the valve 61 and the leak valve 7 are closed and opened, respectively, and the pneumatic cylinders 5 are activated so as to extend their pistons 51 to lift the cylindrical member 3 and holding it at the elevated position.

The hub 111 associated with the one replica 11 is mounted on the lower pressing die 8. The other replica 11 is attracted in the recess 441 of the magnet member 44, with the centre pin 45 of the magnet member 44 inserted into the central opening 112 of the associated hub 111. Then, the lid 4 is seated on the shoulder 32 of the cylindrical member 3, with the centre pin 45 of the magnet member 44 received in the central opening 112 of the hub 111 of the one replica 11. Consequently, two replicas 11 face each other across a gap of about 10 mm in alignment with each other.

Then, the leak valve 7 and the valve 61 are closed and opened, respectively, and the vacuum pump 6 is operated to reduce the pressure of the interior of the sealed space 1 down to about 665 Pa.

After the valve 61 is closed again, the pneumatic cylinders 5 are opened to the atmosphere so as to release the cylindrical member 3 which has been supported by the pistons 51.

Consequently, the cylindrical member 3 is pressed down by the force produced by the atmospheric pressure acting on the lid 4. The pressing force is then transmitted through the upper pressing die 9 to the stack of two replicas 11, 11 to bond them together.

After about 2 seconds, the leak valve 7 is opened and the pneumatic cylinders 5 are activated so as to lift the cylindrical member 3 and the lid 4. Thereafter, the lid 4 is detached from the cylindrical member 3, while the bonded replicas 11, 11 are still attracted by the magnet member 44. Then, the replicas 11, 11 which are now integrated into an optical disk are detached from the magnet member 44.

Figure 10:
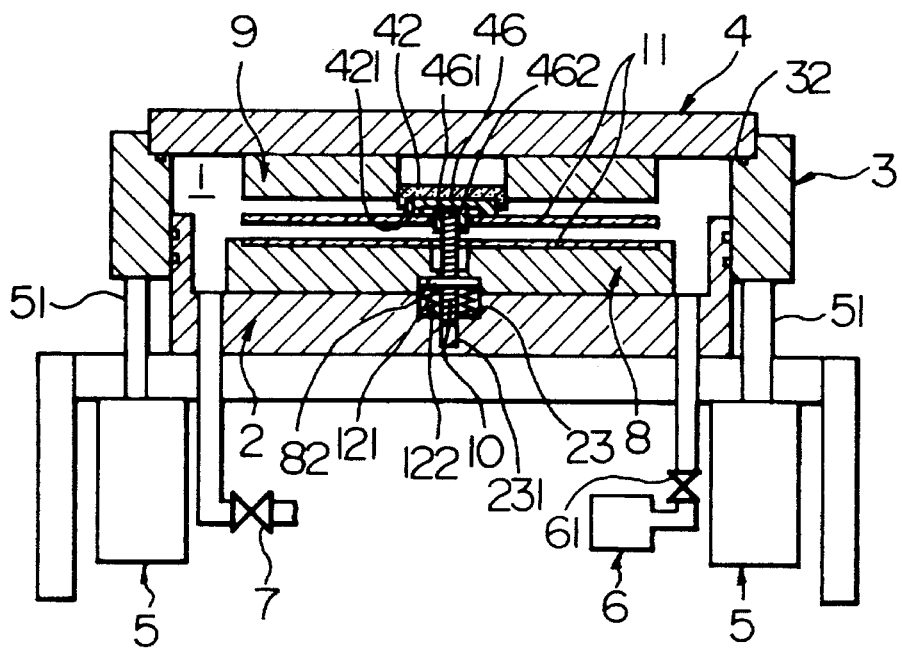

FIG. 10 illustrates an eighth embodiment of the optical disk production apparatus in accordance with the present invention. This embodiment is intended for production of an optical disk by bonding two replicas 11 which do not have hubs.

A circular recess 23 is formed in a centre portion of the bottom of the bottomed tubular member 2, and a centre pin 10 is slidably received in a bore 231 formed in the circular recess 23. The centre pin 10 has an external thread portion onto which a washer 121 is screwed. A spring 122 is disposed between the washer 121 and the bottom of the recess 23. A ring-shaped lower pressing die 8 is fixed to the bottomed tubular member 2. A seat 82 for receiving the washer 121 is formed on the centre of the lower pressing die 8. The outer periphery of the lower pressing die 8 is protruded for engagement with the outer periphery of the replica 11. The centre pin 10 extends beyond the lower pressing die 8 for vertical movement.

A ring-shaped upper pressing die 9 is fixed to the lid 4. A magnet member 42 is secured in the central circular opening formed in the upper pressing die 9. A recess 421 for receiving a locating jig 46 is formed in the centre portion of the magnet member 42. The locating jig 46 is provided at the centre thereof with a boss 461 which is sized to be engageable with a central opening of the replica 11. The boss 461 is provided with a recess 462 for engagement with the centre pin 10.

A description will now be given of the operation of this embodiment.

After the valve 61 and the leak valve 7 are closed and opened, respectively, the pneumatic cylinders 5 are activated to extend their pistons 51 to raise the cylindrical member 3 and to hold it at this elevated position.

One replica 11 is mounted on the lower pressing die 8. The boss 461 of the locating jig 46 is brought into engagement with the central opening of the other replica 11, and the locating jig 46 is fixed by magnetic attraction in the recess 421 of the magnet member 42 held by the upper pressing die 9. Then, the lid 4 is seated on the shoulder 32 of the cylindrical member 3, with the centre pin 10 in engagement with the recess 462 in the locating jig 46. As a consequence, two replicas 11, 11 face each other across a gap of about 10 mm in alignment with each other.

Then, the leak valve 7 and the valve 61 are closed and opened, respectively, and the vacuum pump 6 is operated to reduce the pressure of the interior the sealed space 1 down to about 665 Pa.

Then, after the valve 61 is closed, the pneumatic cylinders 5 are opened to the atmosphere so as to release the cylindrical member 3 which has been supported by the pistons 51. Consequently, the cylindrical member 3 is pressed down by the force produced by the atmospheric pressure acting on the lid 4. This pressing force is applied through the upper pressing die 9 to the stack of replicas 11, 11 to bond them together. Meanwhile, the centre pin 10 is lowered together with the lid 4 while compressing the spring 122.

About 2 seconds later, the leak valve 7 is opened and, at the same time, the pneumatic cylinders 5 are activated so as to lift the cylindrical member 3 and the lid 4. The lid 4 is detached from the cylindrical member 3. Then, the bonded replicas 11, 11 are pushed up by the restoring force of the spring 122 and removed from the centre pin 10.

What is claimed is:

1. An optical disk producing apparatus comprising:

a vacuum pump;

a valve means;

a first tubular member provided with a first through opening communicating with said vacuum pump, a second through opening connected to said valve means, and having a recess for receiving a center pin for holding a pair of optical disk replicas, the center pin defining an axis;

a second tubular member disposed around and closely fitted to said first tubular member through ring means, said second tubular member being axially movable;

a cover member fixed to said second tubular member, wherein said cover member, said first tubular member and said second tubular member cooperate with one another to define a sealed chamber in which said pair of optical disk replicas are disposed;

a piston means affixed to said second tubular member; and an air cylinder means for holding said piston means against an atmospheric pressure applied to said second tubular member through said cover member, while said sealed chamber is evacuated to a predetermined pressure by said vacuum pump.

2. An optical disk producing apparatus according to claim 1, wherein said air cylinder means holds said second tubular member against the atmospheric pressure until the sealed chamber is fully evacuated by said vacuum pump.

3. An optical disk producing apparatus according to claim 1, further comprising a first pressing die fixed to the first tubular member and a second pressing die fixed to the cover member, wherein once said sealed chamber reaches said predetermined pressure, said air cylinder means releases said piston means to said atmospheric pressure so as to bond said pair of optical disk replicas together in order to form said optical disk.

\* \* \* \* \*